Patented Mar. 18, 1930

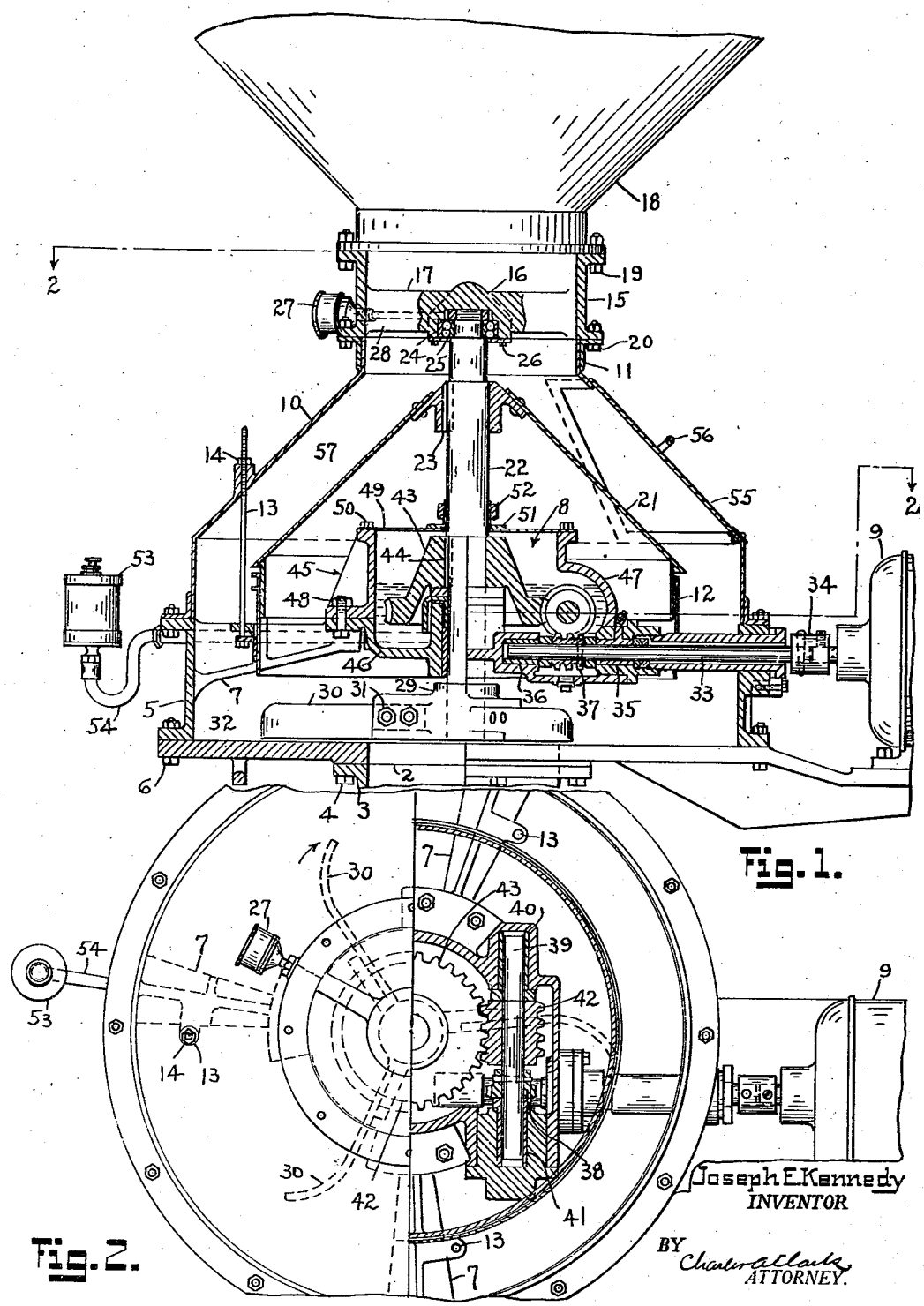

1,751,335

UNITED STATES PATENT OFFICE

JOSEPH E. KENNEDY, OF NEW YORK, N. Y.

FEEDING DEVICE FOR MATERIALS

Application filed December 10, 1927. Serial No. 239,156.

My invention relates to feeders for materials but refers more particularly to feeders for coal, stone or chemicals where an even feed is required.

One object of my invention is to provide a device for feeding materials having a dust proof, variable speed driving mechanism submerged in oil.

Another valuable feature of my invention resides in a closed feeding device in which the material is fed from the center of an inlet and then is directed to a central outlet.

With these and other objects in view, my invention consists of the novel construction, arrangement and formation of parts, hereinafter referred to and described, claimed and substantially as illustrated in the accompanying drawings, wherein similar numerals refer to like parts throughout the several views, in which:—

Figure 1, is a partial cross section of a closed, marine type of feeder.

Figure 2, is a plan, partly in section of Figure 1, taken on lines 2—2 of Figure 1.

Figures 1 and 2, illustrate the marine closed type of feeder which is comprised of a base 1, with a central discharge opening 2, connected to a pipe 3, or to any other apparatus, fastened thereto by the bolts 4, upon which base is mounted a frame 5, by the bolts 6.

This frame has a multiple of spiders or brackets 7, which support the driving mechanism 8, driven by any variable speed motor or any other suitable power 9.

This frame also supports an outer fixed cone 10, a flange 11, and an adjustable material retaining ring 12, by means of a multiple of bolts 13, held adjustable by the nuts 14.

The flange 11, supports a flanged pipe 15, carrying a centrally located bearing 16, by means of a multiple of spiders 17, the upper part of this pipe 15, being bolted to a material receptacle 18, by the bolts 19, and the lower part bolted to the flange 11, by the bolts 20.

Inside of the cone 10, in spaced relation thereto, is another cone 21, which may or may not revolve and when moved is keyed to a vertical shaft 22, by the key 23.

The upper end of this shaft 22, is provided with a ball bearing 24, which is protected from dust by the plate 25, held thereto by the bolts 26, and oil is fed to this bearing by the oil cup 27, and pipe 28.

To the lower end of this shaft 22, is fixed a boss 29, carrying one or more curved blades 30, held thereto by the bolts 31, whose function is to direct the material from the space 32, into the discharge opening 2.

The driving mechanism, for the sake of illustration only, comprises a motor 9, connected by a coupling 34, to the shaft 33, said shaft running in the bearings 35 and 36.

This shaft 33, carries a worm 37, which drives a worm wheel 38, mounted on the shaft 39, in bearings 40 and 41, said shaft also carrying a worm 42, which drives the worm wheel 43, keyed to the shaft 22 by the key 44.

The worms 37 and 42, worm wheels 38 and 43, are enclosed in a dust proof casing 45, the lower part 46, bolted to the flanged upper part 47, by the bolts 48, to which is bolted a plate 49, by the bolts 50, and to make this casing dust proof a dust washer 51, is provided which is held to the shaft 22, by the ring 52, and this casing 45, is supplied with oil by the oil cup 53 and the pipe 54.

The outer cone 10, is provided with a door 55, having a handle 56, so that the feeding space 57, will be accessible for repairs and observation.

In operation, the material from the supply bin or receptacle 18, passing by gravity into the feeding space 57, finally entering the space 32, where it is picked up by the curved, revolving blade or blades 30, and is directed into the discharge opening 2, from whence it is delivered as desired.

Having thus described the preferred embodiment of my invention, I do not wish to limit myself to the exact construction or arrangement shown, since it is evident that modifications may be made therein without departing from the spirit of the invention or scope of the claims.

I claim:—

1. In an enclosed feeding device for materials, means for guiding materials from the center of an inlet between two spaced cones outwardly from a center into a ring shaped pile and means for scraping materials centripetally to a central outlet vertically below the center of said inlet.

2. In an enclosed feeding device for materials, the combination with a base of a fixed inner and outer casing forming cone shaped material transmitting passages, one or more centripetally feeding plows suitably attached to a driving means, said device providing means guiding materials outwardly from one center and inwardly to another center vertically below the first mentioned center.

3. In an enclosed feeding device for materials, the combination with a base of a fixed inner and outer casing providing cone shaped material transmitting passages, one or more centripetally feeding plows and a variable driving means, said device adapted to feed materials outwardly from one center and inwardly to another center vertically below the first mentioned center.

4. In an enclosed feeding device for materials, the combination with a feeding device of a base carrying a revolvable cone inside of a fixed cone, said base having a central outlet and formed to guide materials outwardly from one center and inwardly to another center vertically below the first mentioned center.

5. In an enclosed feeding device for materials, the combination with a feeding device of a base carrying a revolvable cone inside of a fixed cone, said base having suitable outlet means intermediate the periphery and the center, said device adapted to guide materials outwardly from one center and inwardly to another center vertically below the first mentioned center.

6. In an enclosed feeding device for materials, the combination with a feeding device of a base having a central outlet, a fixed outer cone with a centrally arranged inlet, a vertical shaft carrying an inner cone and one or more centripetally feeding blades, a fixed adjustable ring feeding means, a driving mechanism and a variable driving means for the said mechanism.

7. In an enclosed feeding device for materials, the combination with a base having a centrally arranged outlet, a fixed outer cone with a centrally arranged inlet, a vertical shaft carrying an inner cone and one or more centripetally feeding blades, a ring feeding means adjustably held to said outer cone, said cones arranged in spaced relation to each other, a driving means submerged in oil and a variable means for driving the driving means.

8. In an enclosed feeding device for materials, the combination with a base holding a fixed cone shaped enclosing outer casing, a vertical shaft carrying a cone within said outer casing and centripetally directing rotatable blades, a shaft driving means enclosed in a dust proof casing within said inner cone and means for variably driving said shaft driving means, said device providing means for feeding materials outwardly from one center and inwardly to another center vertically below the first mentioned center.

9. In an enclosed feeding device for materials, the combination with a base having a centrally arranged outlet and holding an outer fixed cone shaped enclosing casing, a vertical shaft carrying a rotatable cone within said outer cone and one or more centripetally directing rotatable blades, a ring shaped adjustable material feeding means within said inner cone, a shaft driving means enclosed in a dust proof casing within said inner cone and submerged in oil and means for variably driving the said shaft driving means.

Dated at New York, in the county and State of New York, this 9th day of December, 1927.

JOSEPH E. KENNEDY.